United States Patent [19]

Kanai et al.

[11] Patent Number: 5,450,211
[45] Date of Patent: Sep. 12, 1995

[54] IMAGE FORMING APPARATUS AND METHOD FOR MAINTAINING SET MAGNIFICATION NOT WITHSTANDING CHANGES IN OPTICAL SYSTEM DUE TO TEMPERATURE CHANGE

[75] Inventors: Nobuo Kanai, Toyohashi; Hitoshi Kageyama, Kawasaki; Kenji Takeshita, Toyohashi, all of Japan

[73] Assignee: Minolta Camera Kabushiki Kaisha, Osaka, Japan

[21] Appl. No.: 265,658

[22] Filed: Jun. 24, 1994

[30] Foreign Application Priority Data

Jun. 29, 1993 [JP] Japan .................................. 5-159773
Jun. 29, 1993 [JP] Japan .................................. 5-159774

[51] Int. Cl.6 ...................... H04N 1/036; H04N 1/04; H04N 1/113; H04N 1/393
[52] U.S. Cl. ......................... 358/401; 358/406; 358/451; 358/300; 347/256; 347/134
[58] Field of Search ............... 358/401, 406, 451, 474, 358/468, 296, 300, 302; 355/233, 240, 243; 346/108, 160

[56] References Cited

U.S. PATENT DOCUMENTS

| | | | |
|---|---|---|---|
| 4,888,650 | 12/1989 | Abuyama | 358/451 |
| 5,130,839 | 7/1992 | Tomita | 359/205 |
| 5,233,455 | 8/1993 | Yamaguchi et al. | 359/205 |
| 5,309,205 | 3/1994 | Hayano | 355/243 |

FOREIGN PATENT DOCUMENTS 63-78223 5/1988 Japan .

*Primary Examiner*—Scott A. Rogers
*Attorney, Agent, or Firm*—Willian Brinks Hofer Gilson & Lione

[57] ABSTRACT

A copying machine for forming an image by scanning a laser beam which is emitted from an optical system on a photosensitive member. Photosensors are provided at optically equivalent positions to a beginning portion and an end portion of a scanning line on a photosensitive member. A scanning time of a laser beam in the main scanning direction is measured by these photosensors. The measured time and a standard time for a copy magnification set by an operator are compared, and a correction value is calculated, and at the same time, magnification in the main scanning direction is corrected using the correcting value. Also, focusing (adjusting of the beam diameter) is carried out using the photosensors. Each of the photosensors contains a photoelectric transfer element, and a beam which comes through a slit is incident to the element. Each photosensor is provided with two slits. One is perpendicular to the main scanning direction, and the other is inclined to the main scanning direction. The beam diameter in the main scanning direction is adjusted based on detection of the beam which comes through the slit which is perpendicular to the main scanning direction. The beam diameter in the sub scanning direction is adjusted based on detection of the beam which comes through the slit inclined to the main scanning direction.

19 Claims, 16 Drawing Sheets

F I G. 11
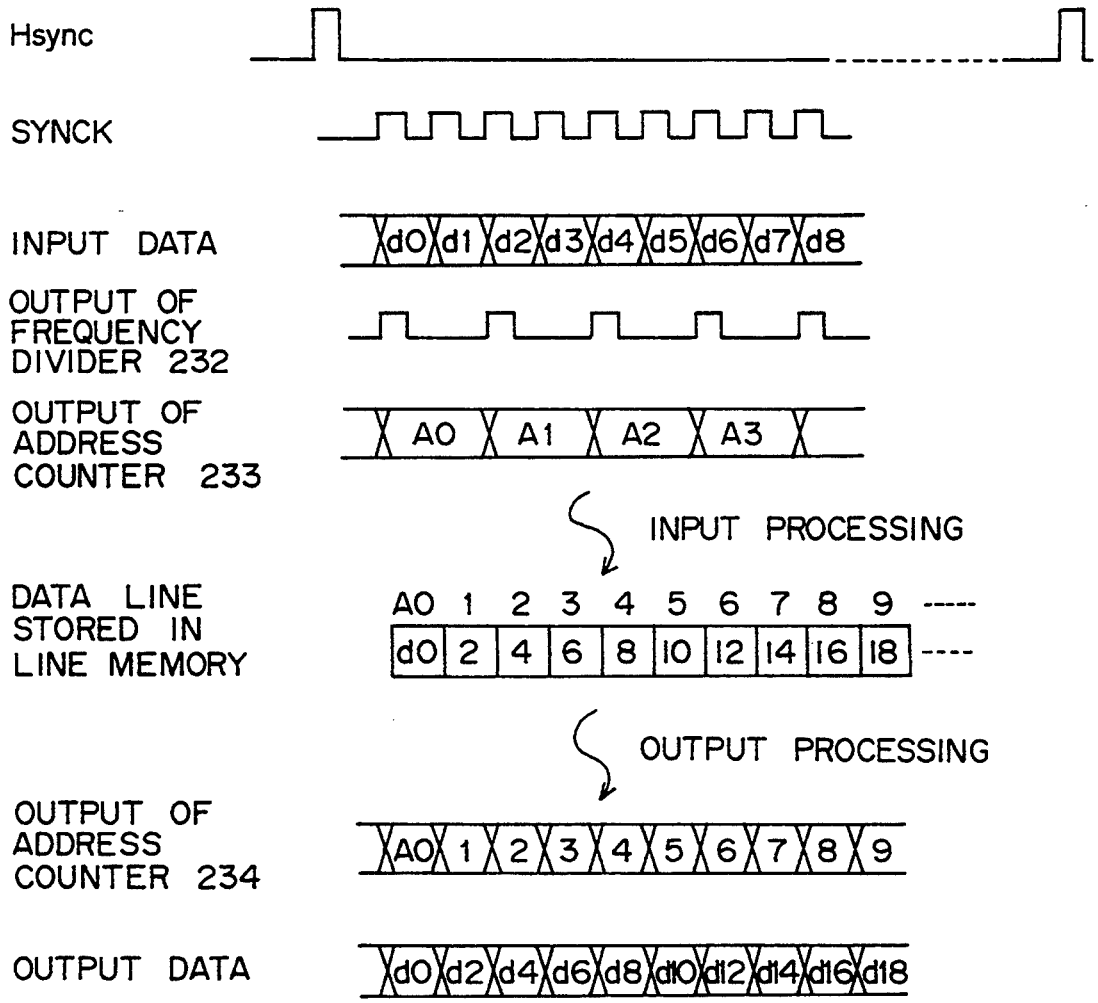
F I G. 12
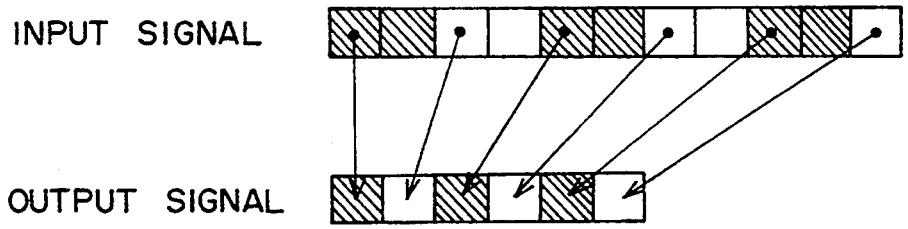

F I G. 13
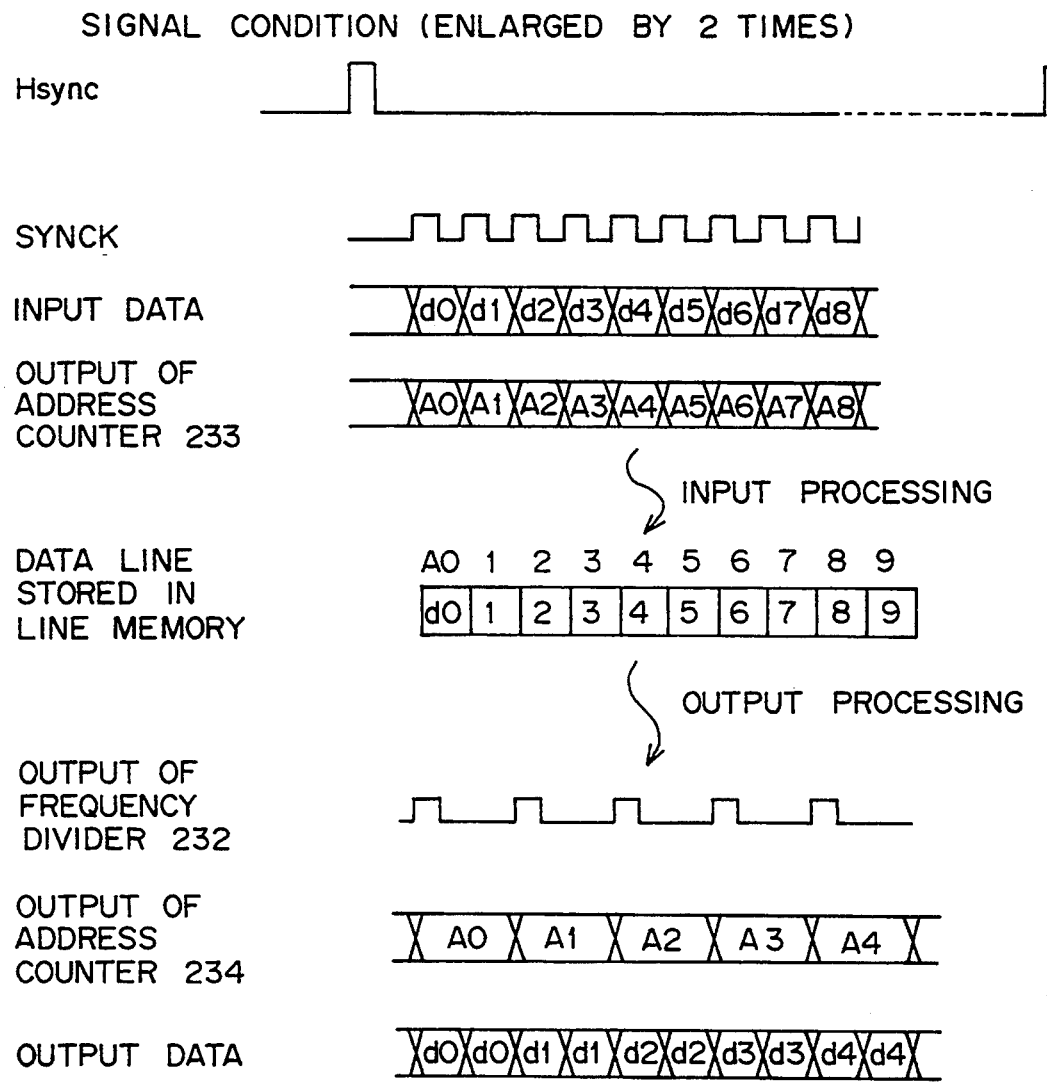
F I G. 14
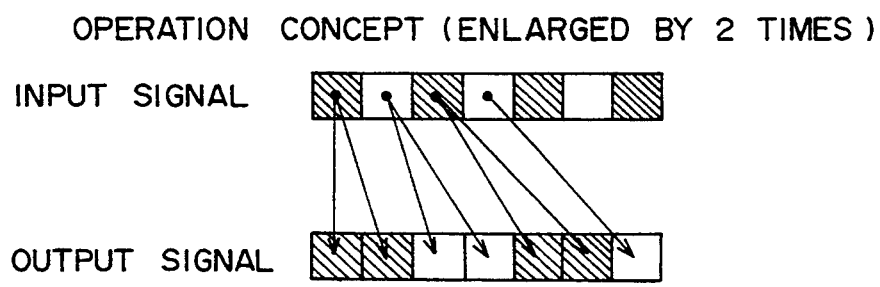

F I G. 15
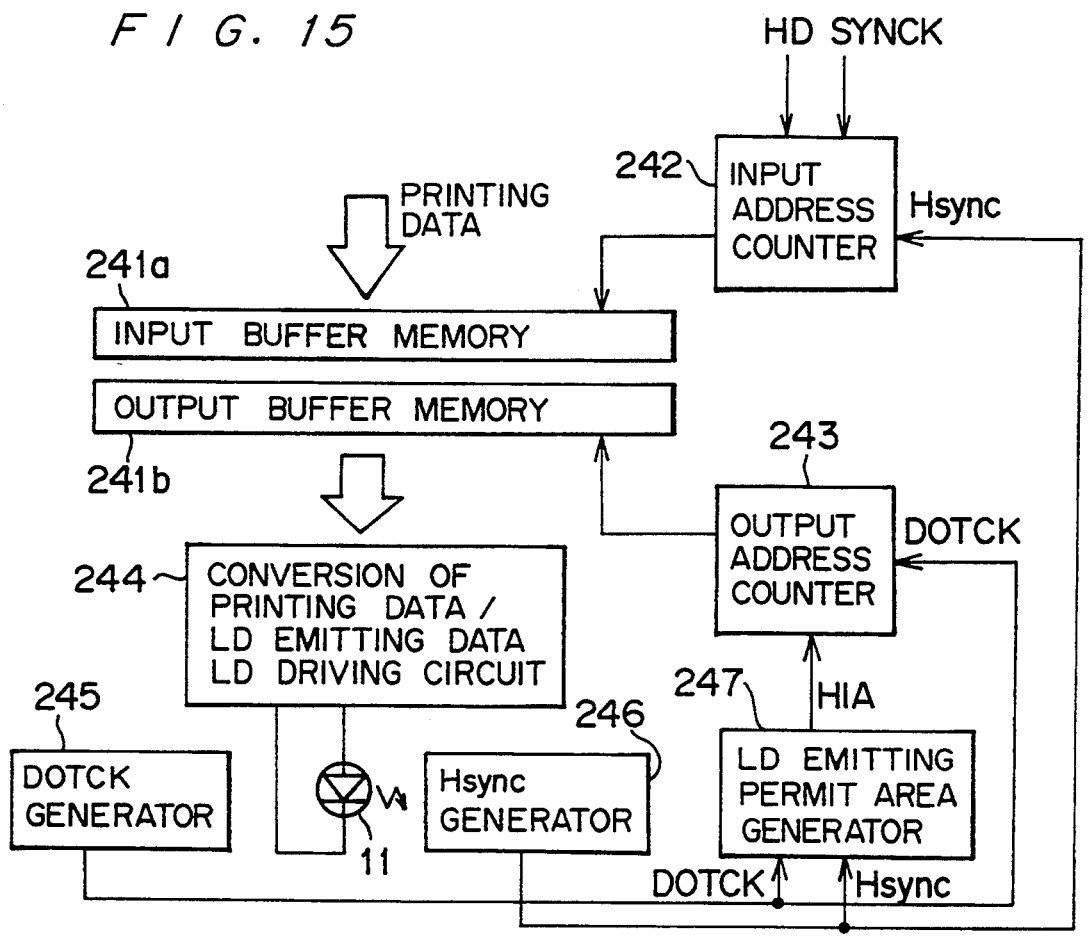
F I G. 16
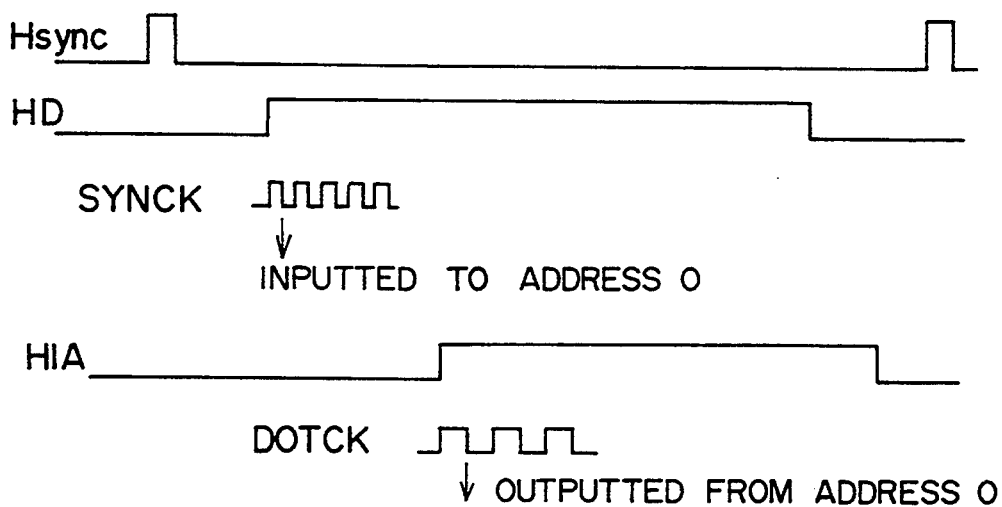

IMAGE FORMING APPARATUS AND METHOD FOR MAINTAINING SET MAGNIFICATION NOTWITHSTANDING CHANGES IN OPTICAL SYSTEM DUE TO TEMPERATURE CHANGE

BACKGROUND OF THE INVENTION

1. Field of the Invention

The present invention relates to an image forming apparatus and an image forming method, and more particularly to an apparatus for reading an original image optically and converting it to digital image data, and then forming an image on a sheet in an electrophotographic method according to the image data.

2. Description of Related Art

Recently, in a field of electrophotographic copying apparatus, image processing is digitized for carrying out multifunctional image edit and full color image formation. In such digitization, a print head of a laser printer is used as image writing means for writing an image on a photosensitive member. In this print head, a laser diode is modulated according to image data, and a laser beam which is emitted from the laser diode is deflected by a polygonal mirror and is scanned on the photosensitive member line by line. This is called main scanning. Sub scanning is carried out by rotation of the photosensitive member. An image is printed on the photosensitive drum two-dimensionally by the main and the sub scanning. In this print head (a laser beam optical scanning apparatus), dot-by-dot modulation can be done easily, and a line in the main scanning direction can be formed to have less irregularity. Also, the beam diameter can be easily changed. Additionally, the print head can be composed at a low cost.

On the other hand, a print head of a digital copying machine requires high performances compared to the laser printer. One of the required performances is accuracy of a printing position. In the digital copying machine, since an error probably occurs in an image reading unit (an image scanner unit), performances such as magnification in the main scanning direction and uniformity of pitch in the main scanning direction are required to be higher than those of the laser printer. High accuracy of a printing position in the sub scanning direction is also required. Irregularity of the printing position appears as periodical unevenness of density (nonuniformity of pitch). This irregularity is caused by periodical movement of the printing position in the sub scanning direction, which results from an error in perpendicularity of deflecting facets of the polygonal mirror and vibration of the polygonal mirror. A tolerance of irregularity in the printing position in the sub scanning direction is smaller in the digital copying machine compared to the laser printer.

An area gradation method, a density gradation method or a many-valued dither method which is the middle of the above two methods can be used to express a half tone. In the area gradation method, several dots are considered as one unit, and the gradation is expressed by changing the number of printed dots in the unit to change a written area. In the density gradation method, the gradation is expressed by changing the density of every single dot. The density gradation method surpasses the area gradation method in expressing the half tone. However, the density gradation method is sensitive to the irregularity of the printing position in the sub scanning direction, and the tolerance of the irregularity is small. In the area gradation method, if the correction factor is about one-several decades, the irregularity of the printing position in the sub scanning direction becomes about several $\mu$m which is no problem. However, in the density gradation method, the accuracy which is 1 $\mu$m or less is required. Therefore, the perpendicularity of the deflecting facets of the polygonal mirror is needed to be improved or an optical system of high correcting performance is needed to be used.

Improving the accuracy in the perpendicularity of the deflecting facets of the polygonal mirror raises the manufacturing cost of the polygonal mirror itself. Thus, an optical system which can correct the perpendicularity of the polygonal scanner effectively is needed to be used. In an optical system for correcting the perpendicularity of the deflecting facets of the polygonal mirror, an area around a deflecting point and a scanned surface (a photosensitive member) are conjugate in the sub scanning direction, and the smaller the magnification is, the more effective the correction is. Therefore, an optical system which has small magnification in the sub scanning direction is needed to be used. Assumed that the focal distance of a f $\theta$ lens is fixed, the diameter of a lens near the scanned surface must be larger, in order to reduce the magnification in the sub scanning direction.

On the other hand, in the print head of the digital copying machine, the beam diameter is preferably small in order to improve the tone expression. Also, curvature of field and distortion needs to be small. Thereby, more lenses are necessary, and this causes a raise of the cost. In order to solve this problem, it is possible that aspherical lenses are used to decrease the number of necessary lenses, using plastic, not glass, as the material. However, plastic may change its shape and its reflection factor with a change of temperature, and this causes a change of a focal distance. The change of the focal distance appears as a change of magnification or blooming (a change of the beam diameter).

In order to adjust the blooming caused by the change of the focal distance, the following way is possible: the laser beam is lead into a slit and is detected by a photoelectric transfer element at position optically equivalent to the photosensitive member; and the focal distance is adjusted based on the detected beam diameter. However, if the slit is formed extending parallel with the main scanning direction, the photoelectric transfer element can not detect the beam diameter in the main scanning direction. Moreover, if the incident beam is shifted even in a small degree in the sub scanning direction, the detection of the beam diameter becomes impossible. Also, since focusing is conducted separately in the main scanning direction and the sub scanning direction, the blooming may occur in the sub scanning direction while the focus in the main scanning direction is adjusted.

SUMMARY OF THE INVENTION

An object of the present invention is to provide an image forming apparatus which, though the focal distance of an optical system changes with a change of temperature, can correct the change of the focal distance and keep the magnification in a main scanning direction at a set value in a simple structure, and an image forming method thereof.

Another object of the present invention is to provide an image forming apparatus wherein correction to the magnification in the main scanning direction, detection of a printing start position and focusing can be conducted in a simple structure by sharing parts, and an image forming method thereof.

Further, another object of the present invention is to provide an image forming apparatus wherein the magnification correcting operation in the main scanning direction does not give a bad influence on printing of the image onto a photosensitive member, and an image forming method thereof.

Further, another object of the present invention is to provide a laser beam optical scanning apparatus which, though the focal distance is changed with a change of temperature, can focus (control a beam diameter) in a simple structure.

In order to attain the objects, an image forming apparatus according to the present invention comprises a magnification changer for changing magnification of digital image data which are outputted from an image reader; a light source for emitting a laser beam according to the image data; a deflecting member for deflecting the laser beam which is emitted from the light source; a plurality of optical elements which are provided between the light source and a photosensitive member; a detector for detecting a change in magnification which is caused by a change of these optical elements; and a controller for controlling the magnification changer according to the detected result of the detector.

In the above structure, though the focal distance is changed as shapes of the optical elements change with a temperature change, a change in the magnification caused thereby can be detected, and the magnification can be kept at a set value with adjustment the detection based on.

The detector of the magnification change is, for example, a temperature sensor for detecting a temperature of the optical elements, or light receiving elements which are provided at a beginning portion and an end portion in the main scanning direction and are at optically equivalent positions to the photosensitive member. In the later case, in order to simplify the structure, the light receiving element which is provided at the beginning portion in the main scanning direction preferably functions as a sensor for detecting a printing start position. Also, for the same purpose, at least one of the light receiving elements preferably functions as a sensor for focusing the optical elements.

Further, the image forming apparatus according to the present invention forbids a magnification changing operation of the magnification changer and/or focusing operation while an image is printed on the photosensitive member. Since the adjustment of the magnification and/or that of the focal point is carried out step by step, the adjusting operation during printing will result in deterioration of the image. However, forbidding these adjusting operations during printing prevents the deterioration of the image.

Furthermore, a laser beam optical scanning apparatus according to the present invention comprises a first slit which is at right angle to the main scanning direction, a second slit which inclines to the main scanning direction and a focus sensor for receiving the laser beam which comes through the first and the second slits, the focus sensor being provided at an optically equivalent position to the photosensitive member.

In the above structure, the first and the second slits are not parallel to the main scanning direction, and the beam diameters in both the main and the sub scanning directions can be detected by the focus sensor. Focusing is carried out based on the detection of the focus sensor to minimize the beam diameter. Particularly, if the first slit which is a right angle to the main scanning direction is used for focusing in the main scanning direction, a rise of the detecting signal becomes steeper, which is preferable, and also this detecting signal can be used as a standard signal of printing start position for each line.

Further, the laser beam optical scanning apparatus according to the present invention comprises a first adjusting device for adjusting focus in the main scanning direction, a cecond adjusting device for adjusting focus in the sub scanning direction separately from the adjustment in the main scanning direction, and a controller for adjusting the focus in the sub scanning direction after adjusting the focus in the main scanning direction. With this control, readjustment of the focus in the sub scanning direction becomes unnecessary, and thus, the focusing can be carried out promptly.

BRIEF DESCRIPTION OF THE DRAWINGS

These and other objects and features of the present invention will become apparent from the following description with reference to the accompanying drawings, in which:

FIG. 11 is a chart which shows a process for reduction copying at a rate of 1/2;

FIG. 12 is a conceptual chart which shows the process for reduction copying at a ratio of 1/2;

FIG. 13 is a chart which shows a process for enlargement copying at a ratio of two;

FIG. 14 is a conceptual chart which shows the process for enlargement copying at a ratio of two;

FIG. 15 is a block diagram which shows a control section of the scanning unit;

FIG. 16 is a time chart which shows action timing of the control section of the scanning unit;

DETAILED DESCRIPTION OF THE PREFERRED EMBODIMENTS

The description of a preferred embodiment according to the present invention is given below, referring to the accompanying drawings.

Figure 1:
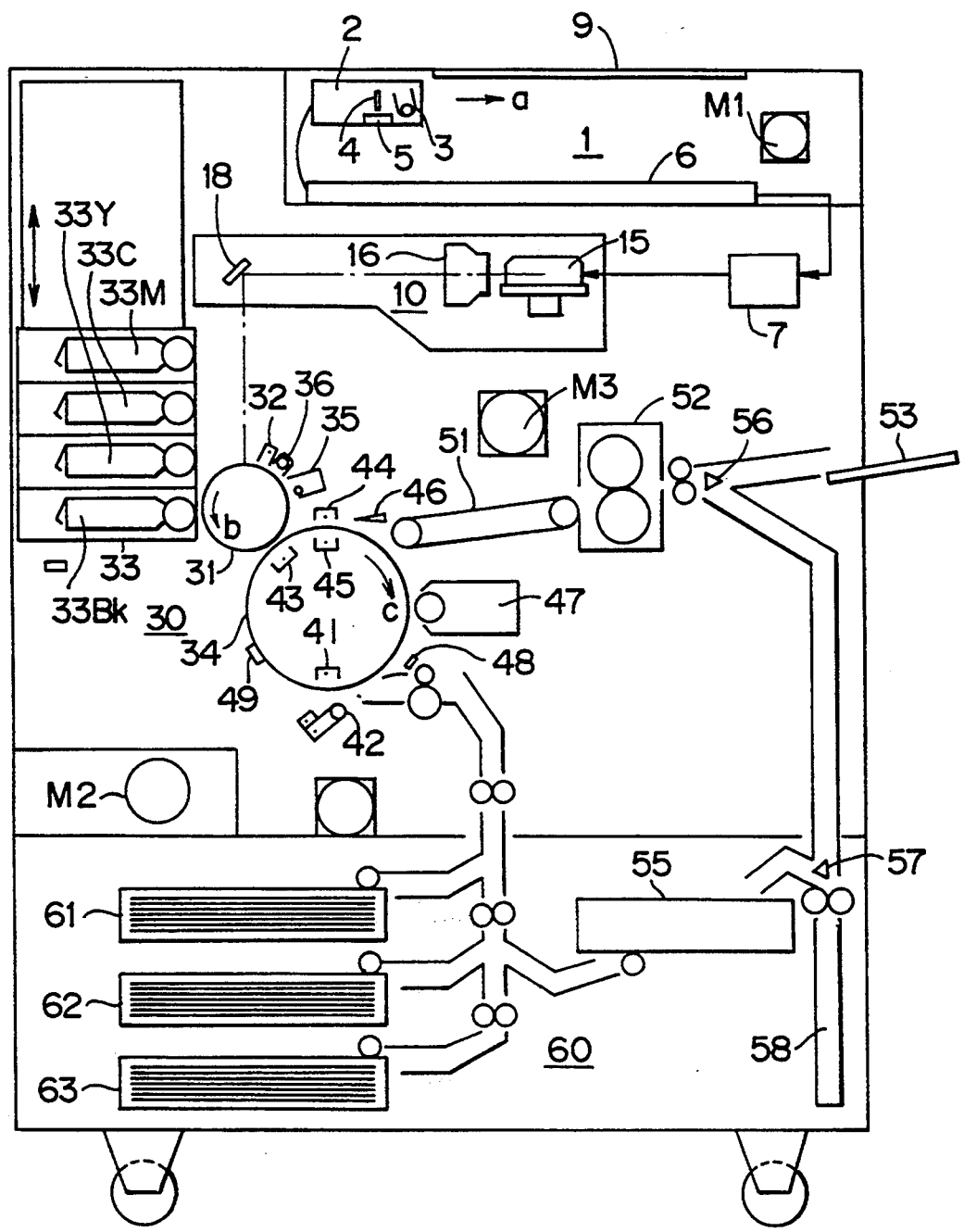
FIG. 1 is an elevational view which shows an internal structure of a full color copying machine which is an embodiment of the present invention.

The following embodiment is a full color digital copying machine. As shown in FIG. 1, an upper section contains an image reader unit 1 and a laser beam scanning unit 10, and a middle section contains a full color image forming section 30, and a lower section contains a sheet feeding section 60.

The image reader unit 1 is composed of a scanner 2 which reads an image of an original document on a platen glass 9 by moving in a direction indicated with an arrow a, and an image signal processing section 6 which converts read image data to data for printing. The scanner 2 contains a lamp 3 which irradiates the original document, a rod lens array 4 which converges a light reflected from the original document, and a contact type CCD color image sensor 5 which converts the reflected light to an electric signal. The scanner 2 is driven by a pulse motor M1, and the image sensor 5 reads an original image line by line as signals of three primary colors which are R (red), G (green) and B (blue). The image signal processing section 6 converts the color signals R, G and B which are converted photoelectrically by the image sensor 5 to digital image data which correspond to C (cyan), M (magenta), Y (yellow) and Bk (black). Then after necessary edit processing, the data are sent to a laser beam scanning unit control section 7.

The laser beam scanning unit 10 scans a laser beam on a photosensitive drum 31 which rotates in a direction indicated with an arrow b according to the image data sent to the control section 7, and an electrostatic latent image is formed on the photosensitive drum 31. The structure and motion of the unit 10 and the image signal processing section 6 will be explained later.

The full color image forming section 30 is mainly consists of the photosensitive drum 31 and a transfer drum 34. A charger 32, a developing unit 33, the transfer drum 34, a residual toner cleaner 35 and a residual charge eraser lamp 36 are provided around the photosensitive drum 31. The developing unit 33 contains developing devices 33M, 33C, 33Y and 33Bk disposed successively from the upper side. The developing devices 33M, 33C, 33Y and 33Bk contain developers including magenta, cyan, yellow and black toners respectively. The developing devices 33M, 33C, 33Y and 33Bk is moved in a body upward and downward by a motor M2, and every time an electrostatic latent image of each color is formed on the photosensitive drum 31, the corresponding developing device is set at a developing position.

The transfer drum 34 is provided rotatable in a direction indicated with an arrow c in synchronization with the photosensitive drum 31. A catching member (not shown) for catching a leading edge of a sheet, an absorption charger 41 for absorbing a sheet on a surface of the transfer drum 34, a sheet pressing roller 42 which can contact with and separate from the transfer drum 34, a transfer charger 43 for transferring toner onto the sheet, erasing chargers 44 and 45, a separator 46 for separating the sheet from the transfer drum 34, a residual toner cleaner 47, a sensor 48 for detecting a standard position of the transfer drum 34 and an actuator 49 of the sensor 48 are provided inside and outside of the transfer drum 34.

In forming a full color image, M, C, Y and Bk toner images are formed successively on the photosensitive drum 31 and the toner images are transferred onto a sheet which is wound round the transfer drum 34 one by one and composed thereon. After four images are composed on the sheet, the separator 46 is actuated to separate the sheet from the transfer drum 34. Also, the residual toner cleaner 47 is actuated to eliminate residual toner on the transfer drum 34.

The sheet feeding section 60 is composed of three feeding trays 61, 62 and 63 which are positioned at three different levels. Each tray contains sheets of a specified size (for example, A4). Sheets are fed one by one from either of the feeding trays 61, 62 and 63 selected by the operator, and sent to the absorption section of the transfer drum 34 by a feeding roller.

The sheet separated from the transfer drum 34 is sent to a fixing device 52 by a feeding belt 51. Then the toner is fixed onto the sheet at the fixing device 52, and the sheet is ejected to a tray 53.

Moreover, this copying machine has an intermediate containing unit 55 which contains sheets temporarily. In a composite copy mode wherein two images are composed on the same side of a sheet, a sheet, after receiving a first image, is guided downward by a diverter 56 and then guided leftward by the other diverter 57 to the intermediate containing unit 55. Also, in a duplex copy mode wherein images are copied on both sides of a sheet, a sheet, after receiving a first image, is first sent to a switchback way 58 and then contained in the intermediate containing unit 55 with its front and back, and top and bottom reversed. Sheets contained sheet in the intermediate containing unit 55 in this way are fed therefrom one by one according to a refeed signal and sent to the absorption section of the transfer drum 34.

Next, the laser beam scanning unit 10 is explained below.

Figure 2:
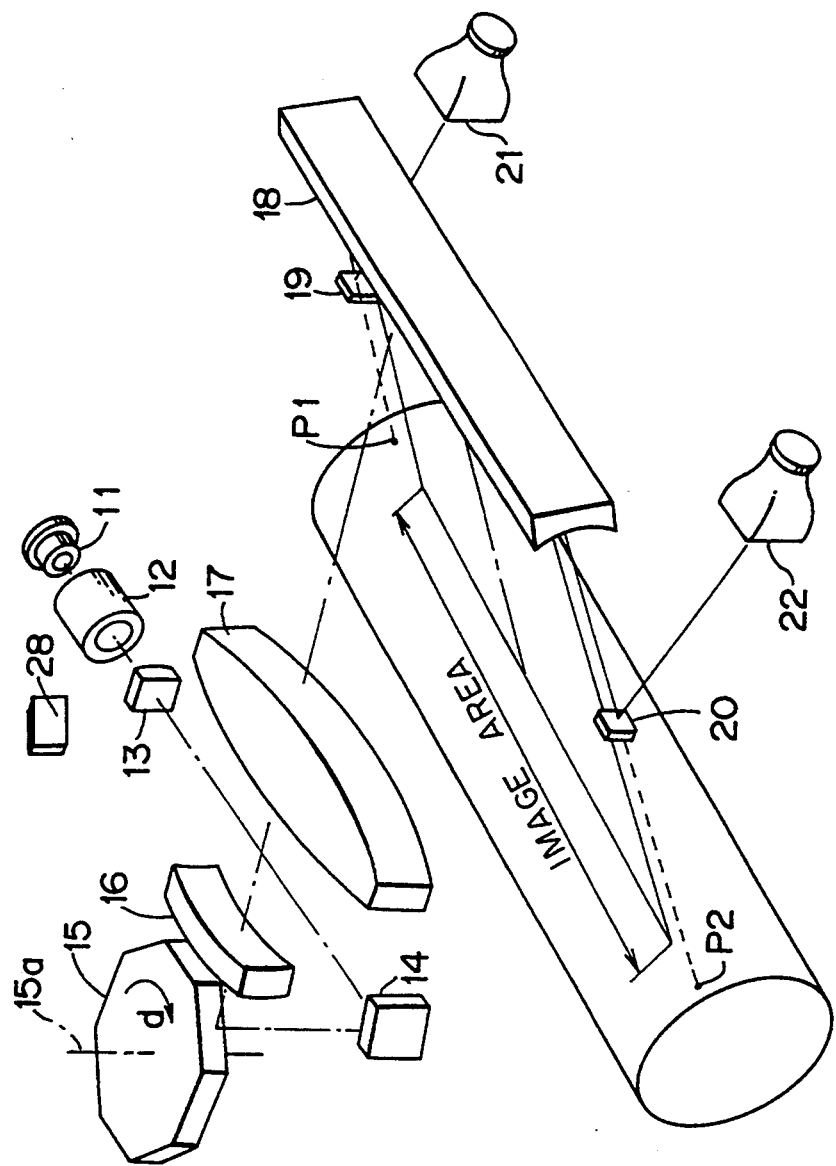
FIG. 2 is a perspective view which shows a schematic structure of a laser beam scanning unit which is contained in the copying machine.

As shown in FIG. 2, this unit 10 contains a laser diode 11, a collimator lens 12, a cylindrical lens 13, a plane mirror 14, a polygonal mirror 15, f θ lenses 16 and 17, a cylindrical mirror 18, plane mirrors 19 and 20 and photosensors 21 and 22. These members are installed in a casing.

The laser diode 11 is modulated (turned on and off) by an LD driving circuit 244 (refer to FIG. 15), and emits a divergent pencil of rays which has image information. This divergent pencil of rays is changed to a parallel pencil of rays by a collimator lens 12, and passes through the cylindrical lens 13, and then reflected by a plane mirror 14 and irradiates deflecting facets of the polygonal mirror 15. The cylindrical lens 13 has a power in the sub scanning direction, and converges a light beam emitted from the collimator lens 12 in the sub scanning direction on a point near the deflecting facets of the polygonal mirror 15.

The polygonal mirror 15 rotates at a constant speed driven by a motor (not shown) in a direction indicated with an arrow d having a shaft 15a as the axis of rotation. Thus, the light beam which is reflected by the plane mirror 14 is reflected continuously by the deflecting facets of the polygonal mirror 15 and deflected at a constant angular velocity. The deflected light beam passes through the f θ lenses 16 and 17. The light beam is then reflected by the cylindrical mirror 18 and imaged on the photosensitive drum 31 as a light beam which has a minute diameter. An affection over the light beam caused by an error in perpendicularity of deflecting facets of the polygonal mirror is corrected by the lenses 13, 16 and 17 and mirror 18. Also, distortion is corrected by the f̄θ lenses 16 and 17 such that a scanning speed is equal from a center to both ends in an image area on the photosensitive drum 31. Further, curvature of field on the photosensitive drum 31 is also corrected in the main scanning direction and the sub scanning direction by the f θ lenses 16 and 17.

A beginning portion and an end portion of the light beam in the main scanning direction, which will be imaged on the photosensitive drum 31 out of the image area, after reflected by the cylindrical mirror 18, are reflected by the plane mirrors 19 and 20 and incident to the photosensors 21 and 22 respectively. The photosensors 21 and 22 are used for detecting the focal point of the optical system and the magnification in the main scanning direction. The photosensor 21 is further used for detecting a print starting position for each line.

Figure 3:
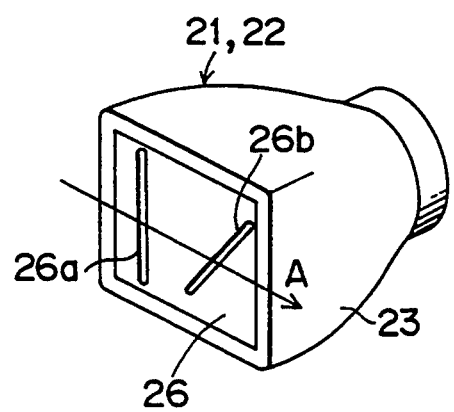
FIG. 3 is a perspective view which shows a photosensor which is contained in the scanning unit.
Figure 4:
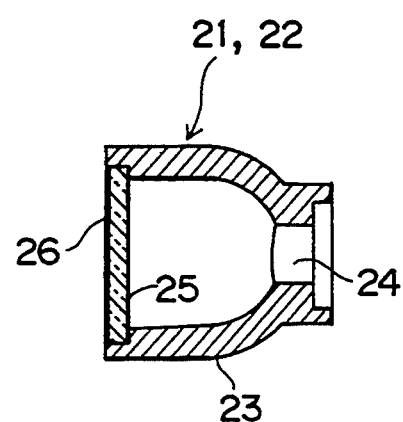
FIG. 4 is a sectional view which shows the photosensor.

As shown in FIGS. 3 and 4, each of the photosensors 21 and 22 contains a photoelectric transfer element 24 at an inner back of a holder 23, a light diffuse transmission plate 25 at a front of the holder 23 and a slit plate 26. The slit plate 26 is made of a light shielding material. A slit 26a which is perpendicular to the main scanning direction A and a slit 26b which is inclined are formed on the slit plate 26. An inner surface of the holder 23 is painted white to reflect a light. The photoelectric transfer elements of the photosensors 21 and 22 are provided at equivalent positions to points P1 and P2 on the photosensitive drum 31. The light beam which is incident to the photoelectric transfer element 24 of the photosensor 21 through the slit 26a is detected to be used as a standard signal of the print starting position.

In FIG. 2, the plane mirror 14 to deflect the light beam is provided before the polygonal mirror 15 in order to compose the light path compact by making a light path of a beam emitted from the laser diode 11 perpendicular to a light path after the polygonal mirror 15.

The collimator lens 12, the cylindrical lens 13, the fθ lenses 16 and 17 and the cylindrical mirror 18 are made of plastic and have many aspherical surfaces, and thus, aberration is corrected well. The reason why plastic is used is that plastic is easy to form into aspheres and is suitable for mass production. However, a plastic lens has a disadvantage that the fractive index and the shape change with a temperature change. As a result, the focal distance changes to an extent which can not be ignored. With this change of the focal distance, an image point is shifted in a direction of the optical axis, and the beam diameter on the photosensitive drum 31 becomes larger.

Figure 5:
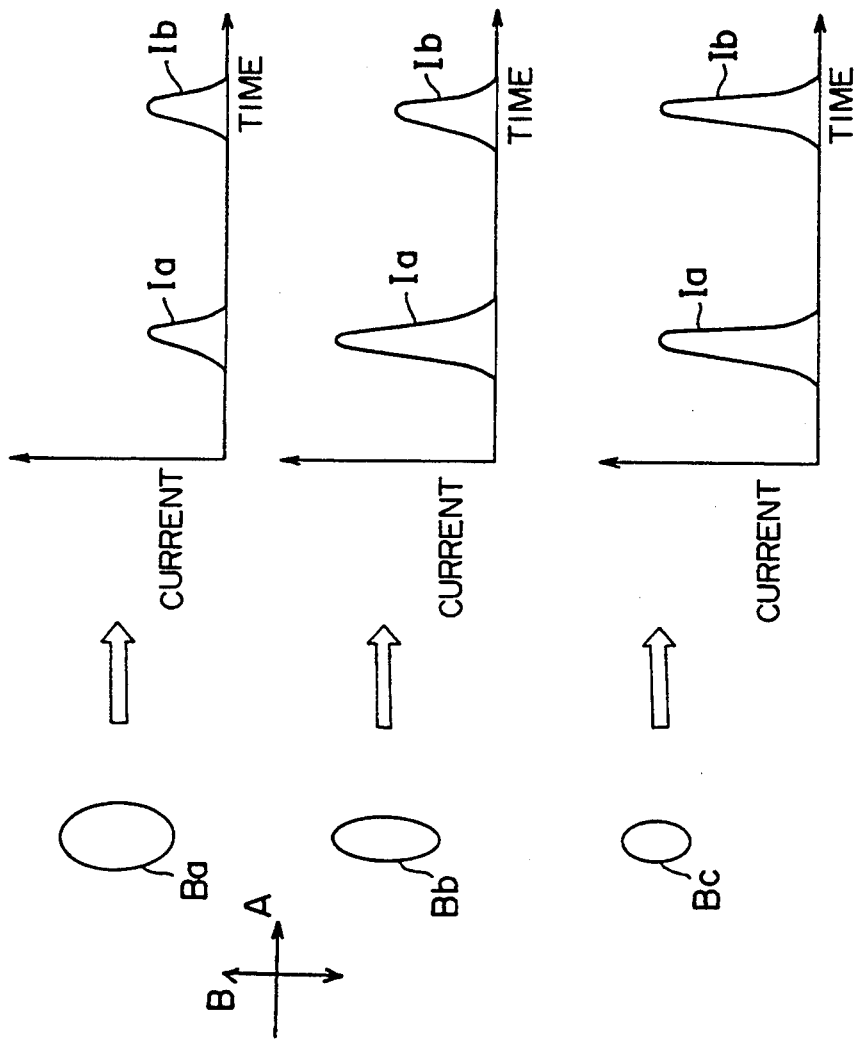
FIG. 5 is a chart which shows current signals generated from the photosensor according to beam spot shapes.

FIG. 5 shows current signals Ia and Ib of the photosensors 21 and 22 (the photoelectric transfer element 24) according to beam spot shapes. The current signal Ia is a signal when the beam goes through the slit 26a, and the current signal Ib is a signal when the beam goes through the slit 26b. Assuming that an ideal beam spot shape (a shape of a beam spot in focus) is Bc, both the current signals Ia and Ib are too strong. When the beam spot shape is big both in the main scanning direction A and in the sub scanning direction B shown as Ba, the current signals Ia and Ib are both weak. Also, when the beam spot shape is big only in the sub scanning direction B shown as Bb, the current signal Ia is strong and the current signal Ib is weak. As explained above, the beam spot shape which is incident to the photosensors 21 and 22 can be judged by the current signals Ia and Ib. Watching these current signals Ia and Ib, positions of the collimator lens 12 and the cylindrical lens 13 in the optical axis direction are adjusted to focus on the photosensitive drum 31.

The photoelectric transfer element 24 which is used in this embodiment converts the luminous intensity of the beam per time unit and also per area unit to a current, and thus outputs the current signals. Therefore, since the luminous intensity of the beam which is emitted from the laser diode 11 is constant, when the beam spot shape becomes larger, the luminous intensity of the beam per area unit becomes small, and thus, the current signal which is outputted from the photoelectric transfer element 24 becomes weak. Conversely, when the current signal is at its maximum, the beam spot is the ideal shape which is in focus. In the embodiment, the beam spot shape is adjusted such that the current signal will be at its maximum.

Figure 6:
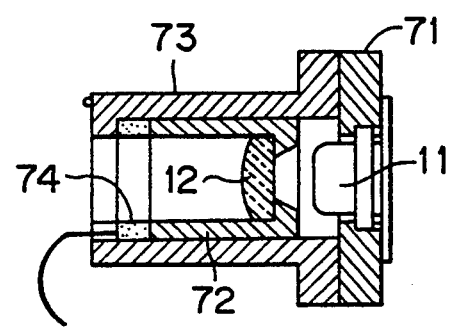
FIG. 6 is a sectional view which shows a driving section of a collimator lens which contained in the scanning unit.

More specifically, as shown in FIG. 6, a holder 71 which keeps the laser diode 11 and a holder 73 which keeps an inner holder 72 of the collimator lens 12 are connected, and a cylindrical piezoelectric element 74 is provided between the inner holder 72 and the holder 73. The piezoelectric element 74 is bent by an applied voltage, and the bend is proportion to the voltage value. Thus, the collimator lens 12 is moved together with the inner holder 72 on the optical axis by changing the voltage value. Thus, the beam diameter in the main scanning direction can be adjusted by moving the collimator lens 12. Conversely, the moving distance of the collimator lens 12 can be detected by the voltage value.

Figure 7:
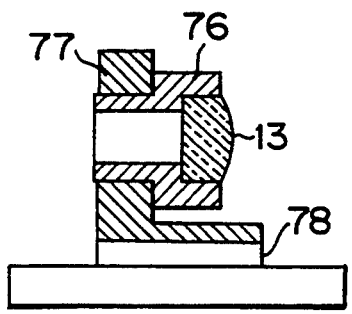
FIG. 7 is a sectional view which shows a driving section of a cylindrical lens which contained in the scanning section.

As shown in FIG. 7, the cylindrical lens 13 is held by a bracket 77 via a holder 76. The bracket 77 is mounted on a linear motor 78. The cylindrical lens 13 is moved together with the bracket 77 on the optical axis. A beam diameter in the sub scanning direction can be adjusted by moving the cylindrical lens 13. Conversely, the moving distance of the cylindrical lens 13 can be detected by a driving amount of the linear motor 78.

For adjusting, the collimator lens 12 is moved to a position where the current signal Ia which is generated when the beam goes through the slit 26a of the photosensor 21 is at its maximum. Then the moving distance of the collimator lens 12 is stored in memorizing means. In the same way, the collimator lens 12 is moved to a position where the current signal Ia which is generated when the beam goes through the slit 26a of the photosensor 22 is at its maximum. Then an average of this moving distance and the moving distance which is detected by the photosensor 21 and stored in the memorizing means is calculated. The collimator lens 12 is moved by the average distance. In this way, the beam diameter in the main scanning direction is adjusted.

Meanwhile, the beam diameter in the sub scanning direction is adjusted. The cylindrical lens 13 is moved to a position where the current signal Ib which is generated when the beam goes through the slit 26b of the photosensor 21 is at its maximum. Then, the moving distance of the cylindrical lens 13 is stored in the memorizing means. In the same way, the cylindrical lens 13 is moved to a position where the current signal Ib which is generated when the beam goes through the slit 26b of the photosensor 22 is at its maximum. Then, an average of this moving distance and the moving distance detected by the photosensor 21 and stored in the memorizing means is calculated. The cylindrical lens 13 is moved by the average distance. In this way, the beam diameter in the sub scanning direction is adjusted.

As explained above, in this embodiment, the adjustment of the beam spot shape (focal point of the optical system) is conducted using the photosensors 21 and 22. The adjustment can be done using either the photosensor 21 or the photosensor 22. However, even if the photosensitive drum 31 is inclined or curved in the main scanning direction or the sub scanning direction by an error in processing or in assembling, the influence of these errors can be decreased by taking the average of the detecting result of the photosensors 21 and 22.

The collimator lens 12 has a power both in the main scanning direction and in the sub scanning direction, and the cylindrical lens 13 has a power only in the sub scanning direction. If the cylindrical lens 13 is moved first to adjust the beam diameter in the sub scanning direction, and then the collimator lens 12 is moved to adjust the beam diameter in the main scanning direction, the beam diameter may be out of adjustment. However, in this embodiment, first, the collimator lens 12 is moved to adjust the beam diameter in the main scanning direction, and then, the cylindrical lens 13 is moved to adjust the beam diameter in the sub scanning direction. Since the cylindrical lens 13 does not have a power in the main scanning direction, the beam diameter in the main scanning direction which is adjusted first will not be out of adjustment.

Next, the extending directions of the slits 26a and 26b are explained below. A slit extending in the main scanning direction cannot detect a change of the beam diameter in the main scanning direction because the output of the photoelectric transfer element is the same even with the change of the beam diameter. Moreover, if the beam is shifted in the sub scanning direction even by a slight distance, the detection can not be conducted. On the other hand, a silt extending in the sub scanning direction cannot detect a change of the beam diameter in the sub scanning direction because the output of the photoelectric transfer element is the same even with the change of the beam diameter. Therefore, in this embodiment, the slit 26b for adjusting the beam diameter in the sub scanning direction is inclined by 45 degrees to the main scanning direction, and the slit 26a for adjusting the beam diameter in the main scanning direction is inclined by 90 degrees to the main scanning direction. The slit 26a can be inclined by 45 degrees to the main scanning direction, however, in this embodiment, since the slit 26a is also used to obtain the standard signal of the print starting position for each line, the slit 26a is inclined by 90 degrees to the main scanning direction in order to increase the raising speed of the current signal Ia.

Also, the adjustment of the beam spot shape (focal point) is forbidden during one-sheet image formation on the photosensitive drum 31. If this adjustment is carried out at real time and the lenses 12 and 13 are moved successively, there would be no problem. However, practically, it is difficult to conduct the adjustment at real time, and when the lenses 12 and 13 are moved step by step, the density of the image is also changed step by step, and thereby the image is deteriorated. More specifically, this adjustment is preferably carried out right before the printing of one-sheet image.

Figure 8:
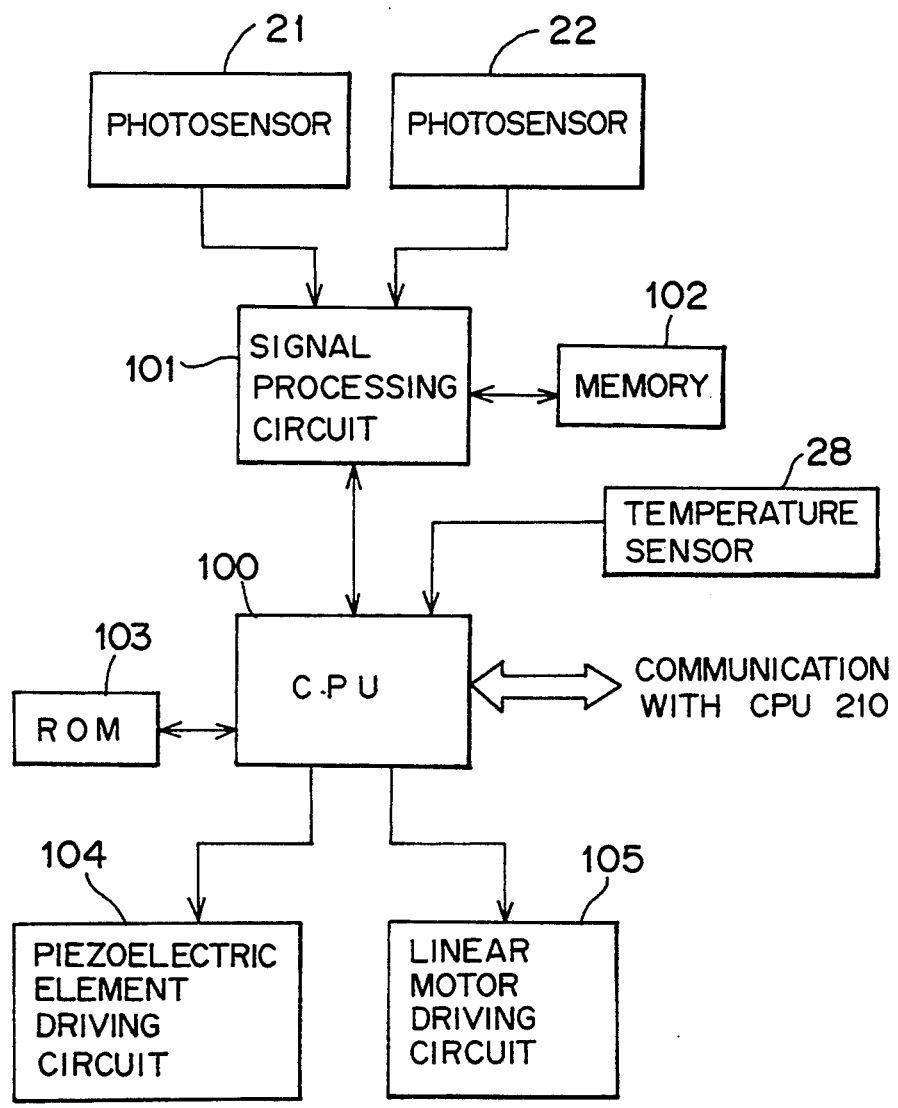
FIG. 8 is a block diagram which shows a control circuit of the copying machine.

FIG. 8 shows a control circuit for controlling the full color image forming section 30 and the sheet feeding section 60 of the copying machine.

The control is carried out mainly by a CPU 100. The current signals generated from the photosensors 21 and 22 are inputted to the CPU 100 via a signal processing circuit 101. The signal processing circuit 101 has a memory 102. The CPU 100 outputs control signals to a driving circuit 104 of the piezoelectric element 74 which is a driving source of the collimator lens 12 and to a driving circuit 105 of the linear motor 78 which is a driving source of the cylindrical lens 13.

Next, correction of the magnification in the main scanning is explained below.

When the focal distances of the fθ lens 16 and 17 change with a change of temperature, the magnification in the main scanning is changed, and it appears on the image as expansion or shrinkage of the printing width in the main scanning direction. There are two methods of correcting the change of the magnification in the main scanning. One is a method using the photosensors 21 and 22. The other is a method using a temperature sensor 28 which is provided in the laser beam scanning unit 10 as shown in FIG. 2.

The method using the photosensors 21 and 22 is described. First, a period from the detection of the beam by the photosensor 21 to the detection by the photosensor 22 is measured by counting pulses of a systemclock SYNCK. Standard values of the time between the detection of the beam by the photosensor 21 and the detection by the photosensor 22 which correspond to all possible copy magnifications are stored in a ROM 103 beforehand. Then, the standard value corresponding to a presently set copy magnification and the measured value are compared. Assuming that the measured time is x and that the standard time is 1, a change of the magnification in the main scanning caused by a change of the focal distance of the fθ lenses 16 and 17 is 1/x. Therefore, an image can be formed actually the desired magnification by multiplying the presently set magnification by 1/X. The correction of the magnification is possible by a data reference method. Data of the standard time, the measured time and the correction are stored in the ROM 103 beforehand, and a correction value is determined referring to the data.

The method using the temperature sensor 28 is described. The temperature around the fθ lenses 16 and 17 is measured by the temperature sensor 28. The measured value is inputted to the CPU 100, and a correction value is calculated according to the measured value. The changing rate of the focal distance of the fθ lenses 16 and 17 with changes of the temperature has been obtained beforehand and inputted to the ROM 103. A correction value is calculated based on the data or is referred to the data, and then the correction value is sent to the image signal processing section 6. Assuming that the copy magnification set by the operator is $\alpha$ and that the correction value determined in this way is $\beta$, the magnification in the main scanning direction is reset to $\alpha \times \beta$.

The magnification correction in the main scanning direction is highly improved by using a humidity sensor together with the temperature sensor 28.

With such magnification correction in the main scanning direction, the set magnification is maintained in spite of changes of the focal distance of the fθ lenses 16 and 17. How to correct the magnification in the main scanning direction in the image signal processing section 6 is explained in detail later.

Also, the above magnification correction in the main scanning direction is forbidden during one-sheet image formation on the photosensitive drum 31. If this correction is carried out successively, there would be no problem. However, since the correction is substantially carried out digitally in the image signal processing section 6, misalignment occurs in the image after the correction. Thus, this correction is preferably carried out right before the printing of one-sheet image.

Next, the image signal processing section 6 which is provided in the image reader unit 1 is explained.

Figure 9:
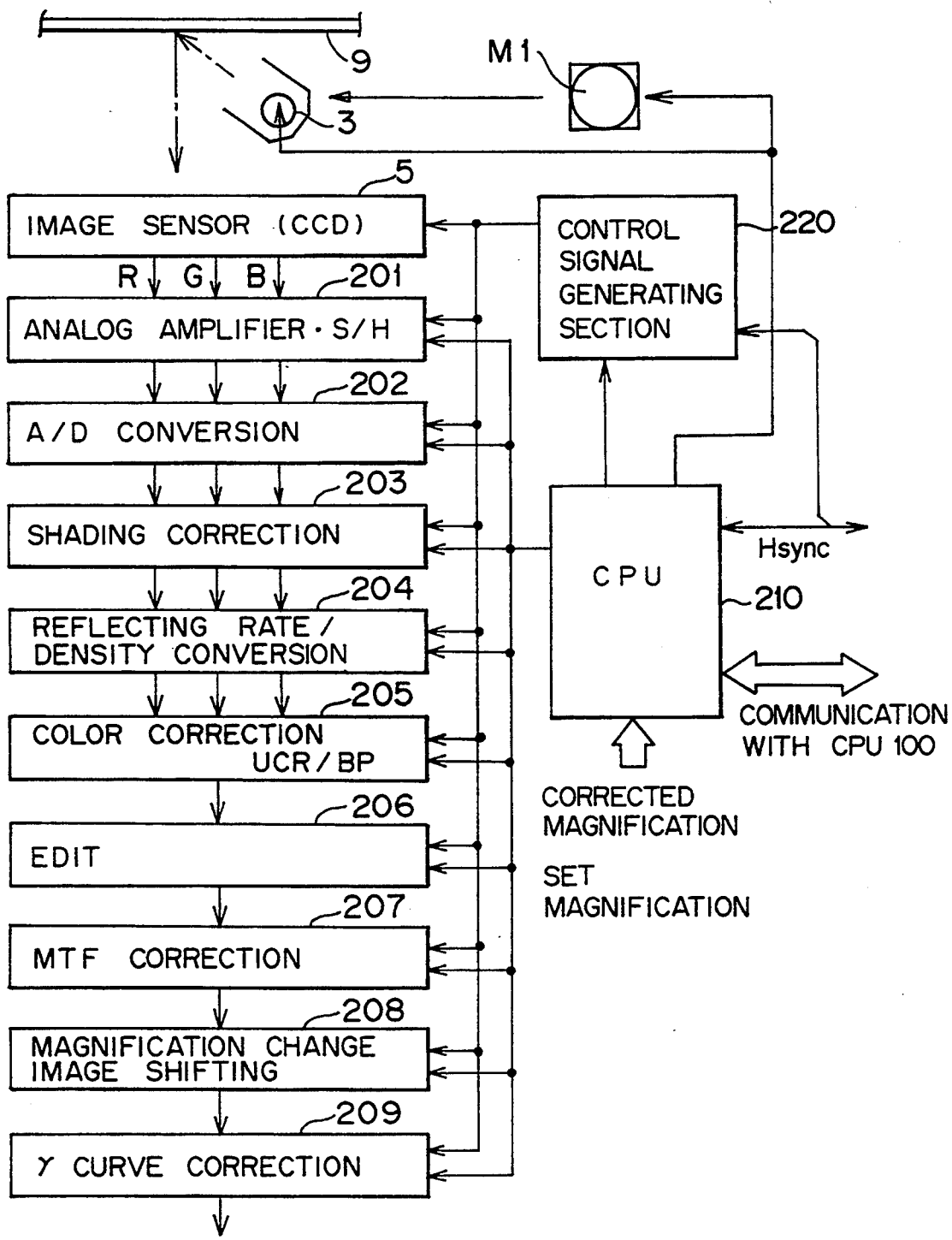
FIG. 9 is a block diagram which shows an image signal processing section in the control circuit.

In FIG. 9, the image signal processing section 6 is controlled by a CPU 210. The CPU 210 communicates with the CPU 100 shown in FIG. 8 to exchange necessary information. The image signal processing section 6 is composed of the following blocks:

an analog amplifier S/H (sample hold) block 201 which amplifies an analog signal of an original image which is converted photoelectrically by the color image sensor 5 (CCD) in the scanner 2;

an A/D transfer block 202 which converts the analog signal amplified in the block 201 to a digital signal;

a shading correcting block 203 which corrects unevenness in the luminous energy from the exposure lamp 3 and unevenness in the sensitivity of the picture elements of the image sensor 5 and generates an image signal for each picture element with the density corrected;

a reflecting rate/density converting block 204 which converts the reflecting rate indicated by the image signal transmitted thereto. The image signal processed before this point is a signal which is proportion to the amount of the light reflected from the original to the density and simultaneously conducts tone reproduction processing to emphasize a highlight and a shadow.

a color correction and UCR/BP block 205 which combines image signals of the three primary colors to generate printing signals of Y, M, C and Bk instructed by the CPU 210;

an editing block 206 which edits the printing signals variously, for example trims the signals to erase an image which is out of a designated area;

an MTF correction block 207 which carries out edge emphasizing processing and smoothing processing;

a magnification change and image shifting block 208 which this changes the density of the picture elements (magnification) in the main scanning direction, shifts the image and outputs the image in the same area repeatedly (image repeat); and a γ curb correcting block 209 which corrects the picture quality and the tone.

In each of the blocks 201,202,203 and 204, the signals of the three primary colors (R, G, B) are processed simultaneously.

Each of the above blocks is operated according to an operation parameter which is given directly from the CPU 210 and a signal (such as a driving pulse signal) which is given from a control signal generating section 220. The printing signals which are generated through the above process are sent to the laser beam scanning unit control section 7 and used for controlling modulation of the laser diode 11.

Figure 10:
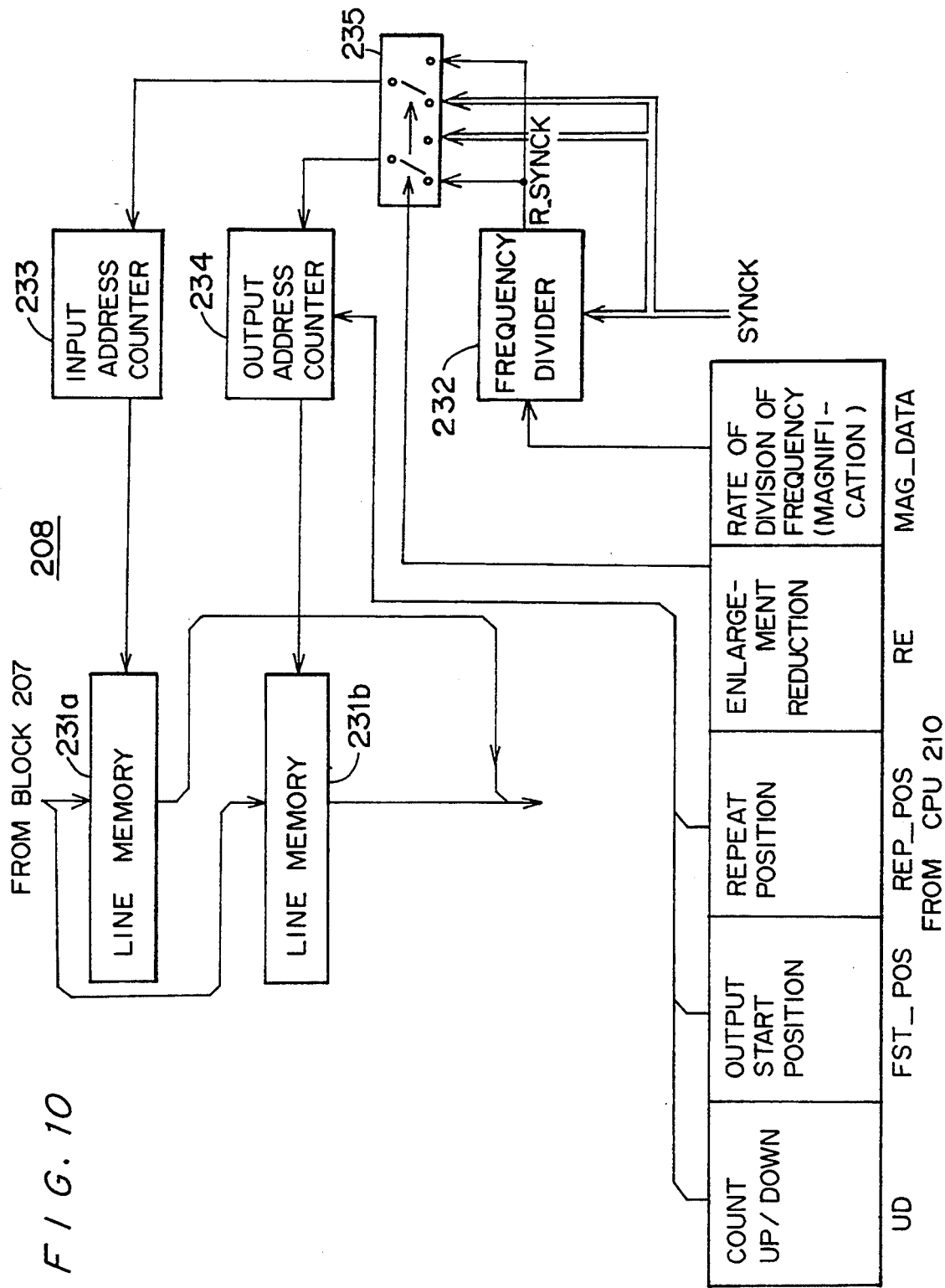
FIG. 10 is a block diagram which shows a magnification change and image shifting block in the image signal processing section.

FIG. 10 shows the composition of the magnification change and image shifting block 208. One-line image data are given from the MTF correction block 207 are first stored in an input line memory 231a. At this time, an input address counter 233 controls allocation of the data to addresses of the line memory 231a. The input address counter 233 generates address data based on a clock signal which is sent from a selector 235.

The clock signal which can be selected by the selector 235 is a transfer clock SYNCK for transferring the inputted image data or a frequency-divided clock R__SYNCK of the clock SYNCK. The frequency-divided clock R__SYNCK is given to the input address counter 233 for reduction copying. The signal SYNCK is given for enlargement copying. The operation of the selector 235 is carried out according to an reduction/enlargement signal RE. The rate of division of frequency (magnification) is given to a frequency divider 232 from the CPU 210 as MAG__DATA.

Every time a horizontal synchronization signal Hsync based on the printing start position detecting signal is inputted to the CPU 210, the line memories 231a and 231b exchange their roles controlled by an output address counter 234. More specifically, after storage of one-line image data in the line memory 231a, when the next one-line image data are inputted to the magnification change and image shifting block 208, the line memory 231a which is stored with the previous one-line image data works as an output line memory 231b. The line memory 231b outputs the image data controlled by the output address counter 234. At that time, the clock SYNCK or the frequency-divided clock R__SYNCK is given to the output address counter 234. However, opposite to the case of the input address counter clock 233, the clock SYNCK is given for reduction copying, and the clock R__SYNCK is given for enlargement copying. Also, a repeat position signal POS and a count signal UD are inputted from the CPU 210 to the output address counter 234. These signals are used for image repeat, image shifting and mirror image formation. The explanation is continued assuming that these control signals are all in standard condition.

According to the frequency division rate (magnification) data MAG__DATA which is outputted from the CPU 210, the frequency divider 232 generates the clock R__SYNCK which has a pulse frequency lowered at the designated rate. FIGS. 11 and 12 show the operation of each section to carry out reduction copying at a rate of 1/2. In this case, the input address counter 233 is provided with a clock R__SYNCK whose pulse frequency is a half of that of the clock SYNCK. FIGS. 13 and 14 show operations of each section to carry out enlargement copying at a rate of 2. In this case, the output address counter 234 is provided with the clock R__SYNCK.

The magnification correction in the main scanning direction is sent back as the frequency division rate data MAG__DATA for the control carried out in the magnification change and image shifting block 208.

FIG. 15 shows the composition of the laser beam scanning unit control section 7 and generation of a signal therefrom. This control section 7 is controlled by the CPU 100.

One-line print data which are transferred from the image signal processing section 6 are first stored in an input buffer memory 241a. Before the storage, the horizontal synchronizing signal is given, and the memory 241a is reset. The allocation of the print data to addresses of the buffer memory 291a in controlled by the clock SYNCK, and the storage is conducted while an HD signal is active.

The input buffer memory 241a which is stored with the one-line print data works as an output buffer memory 241b after the horizontal synchronizing signal Hsync is inputted. The print data are read out from the output buffer memory 241b controlled by the output address counter 243 which counts a synchronous clock DOTCK for emitting light from the laser diode 11. This data output is conducted while an HIA signal is active. The HIA signal is generated by an LD emitting permit area generator 247 which counts pulses of the synchronous clock DOTCK based on an input of the horizontal synchronizing signal Hsync.

The synchronous clock DOTCK for emitting light from the laser diode 11 is generated by a generator 245, and the horizontal synchronizing signal Hsync is generated by a generator 246 according to a laser beam detecting signal which is detected by the photosensor 21.

The print data which are read out from the output buffer memory 241b are inputted to an LD driving circuit 244. The LD driving circuit 244 converts the print data to an LD light emitting data according to a light emitting characteristic of the laser diode 11 in order to modulate and drive the laser diode 11.

FIG. 16 shows timing of input/output of the printing data to/from the buffer memories 241a and 241b. As it is clear in this figure, the input to the buffer memory 241a and the output from the buffer memory 241b are asynchronous. The input timing can be determined optionally by the CPU 100 based on the horizontal synchronizing signal Hsync. That means that the printing position in the main scanning direction on the photosensitive drum 31 by the laser beam can be moved optionally. Thus, the image transfer position in the main scanning direction on the sheet is movable.

Next, a control procedure of the CPU 210 is explained referring to FIGS. 17 through 21. However only the control procedure which is related to the present invention is explained.

Figure 17:
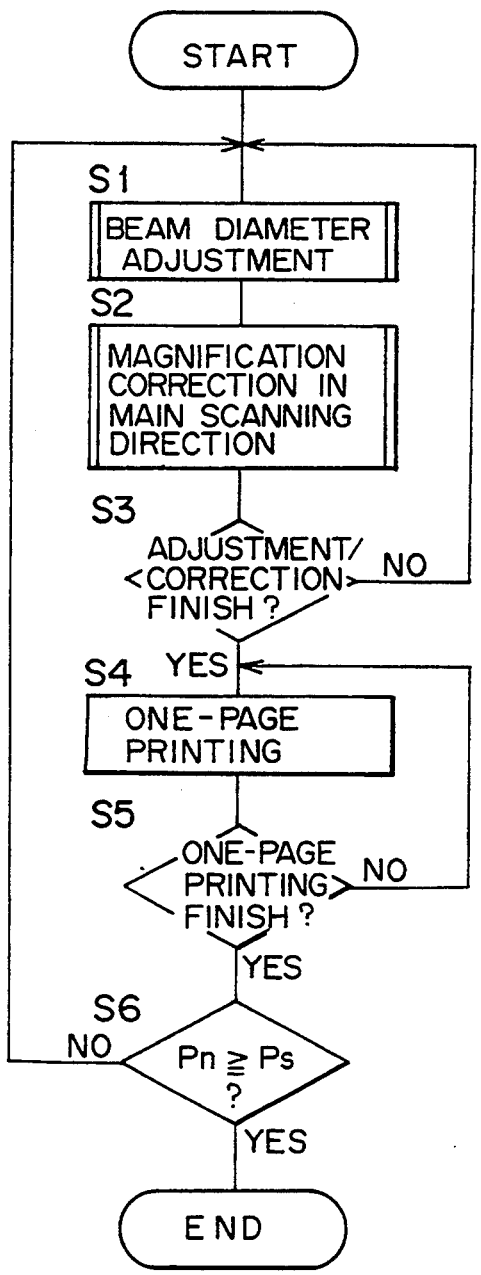
FIG. 17 is a flow chart which shows a subroutine for printing process of a CPU of the scanning unit control section.

FIG. 17 shows a control procedure of the CPU 100 after a print switch is turned on.

First, the beam diameter is adjusted automatically at step S1, and the magnification in the main scanning direction is corrected automatically at step S2. Next, when it is judged at step S3 that the adjustment and the correction are finished, one-page printing is carried out at step S4. Next, when it is judged at step S5 that the one-page printing is finished, at step S6, it is judged whether a number Pn of repetitions of the copy operation is larger than a number Ps set by the operator. If the number Pn is smaller than the number Ps, the processing goes back to the step S1, and this subroutine is finished when the number Pn becomes equal to the number Ps.

Figure 18:
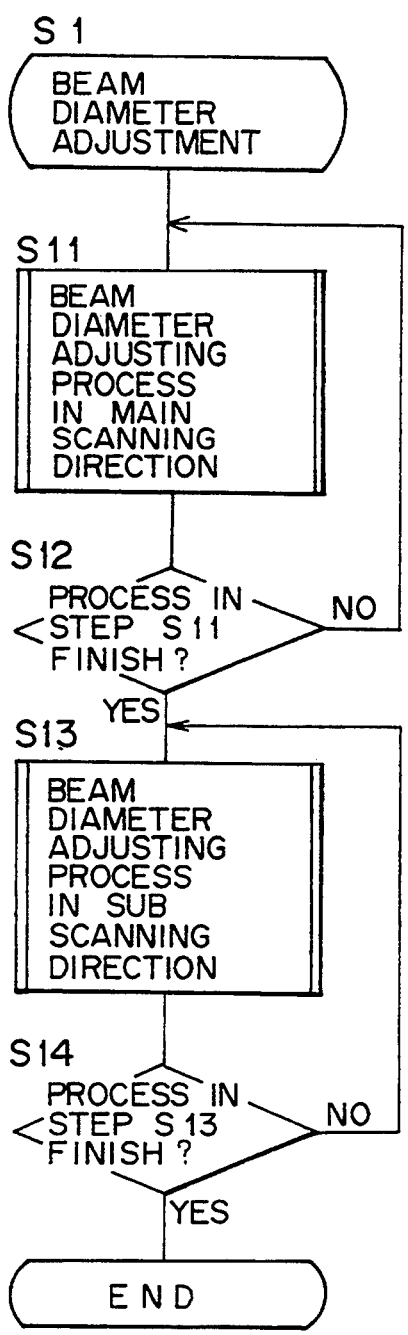
FIG. 18 is a flow chart which shows a subroutine for adjusting a beam diameter carried out in step S1 in FIG. 17.

FIG. 18 shows a subroutine for adjusting the beam diameter which is carried out at step S1.

First, the beam diameter in the main scanning direction is adjusted at step S11. When it is confirmed at step S12 that the adjustment is finished, the beam diameter in the sub scanning direction is adjusted at step S13. Then, when it is confirmed at step S14 that the adjustment is finished, this subroutine is finished.

Figure 19:
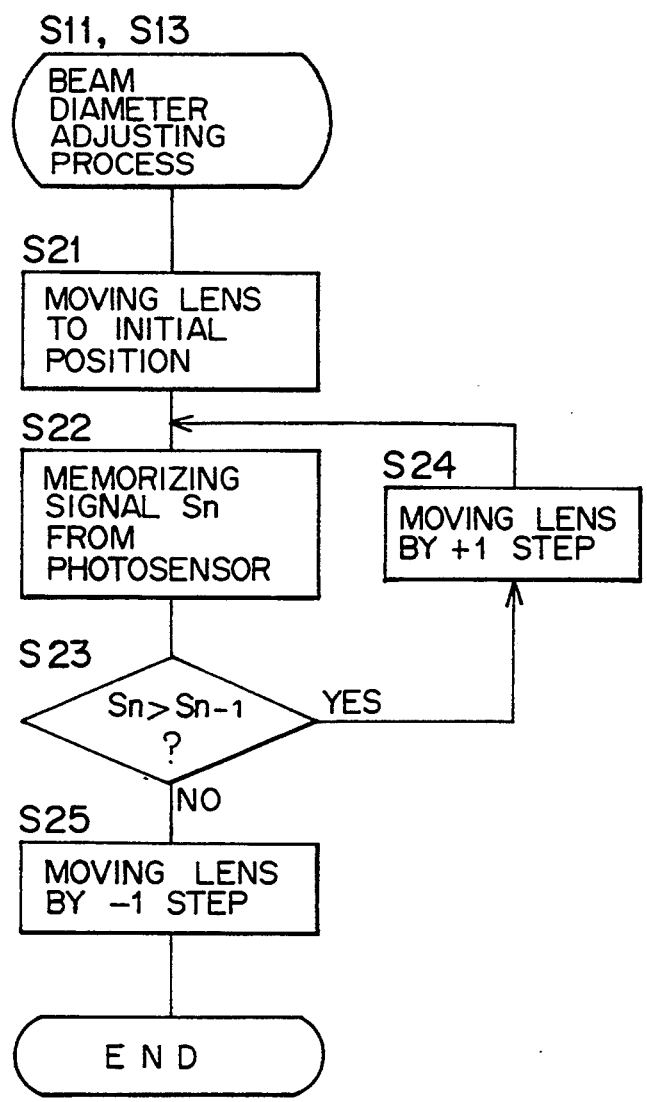
FIG. 19 is a flow chart which shows a subroutine for adjusting a beam diameter carried out in steps S11 and 13 in FIG. 18.

FIG. 19 shows a subroutine of adjusting the beam diameters in the main scanning direction and in the sub scanning direction which is carried out in steps S11 and S13.

First, the piezoelectric element 74 or the linear motor 78 is driven to set the collimator lens 12 or the cylindrical lens 13 at an initial position. In this moment, the laser diode 11 makes regular emission, and the polygonal mirror 15 rotates. Then, a signal $S_n$ which comes from the photosensor 21 is memorized at step S22. The signal $S_n$ means a value of a current signal Ia or Ib at n times, and an initial value of these signals is $S_0$.

Next, the signal $S_n$ of this time and the signal $S_{n-1}$ of the former time are compared at step S23. When $S_n > S_{n-1}$, the lens 12 or the lens 13 is moved by $+1$ step, and the operation goes back to the step S22. Moving by $+1$ step means that the lenses 12 or 13 is moved toward the laser diode 11 by a specified amount. On the other hand, if it is not $S_n > S_{n-1}$, the lens 12 or the lens 13 is moved by $-1$ step at step S25, and this subroutine is finished. Moving by $-1$ step means moving the lens 12 or the lens 13 away from the laser diode 11 by the specified amount. In the above processing, the lenses 12 and 13 are set such that the beam spot is focused on the photosensitive drum 31 in the minimum size.

In the subroutine shown in FIG. 19, a method of adjusting the beam diameter automatically using only the photosensor 21 is shown. As explained in FIGS. 5, 6 and 7, with using both the photosensors 21 and 22, the lens 12 or 13 can be moved based on the average value of the signals $S_n$ from the photosensors 21 and 22.

Figure 20:
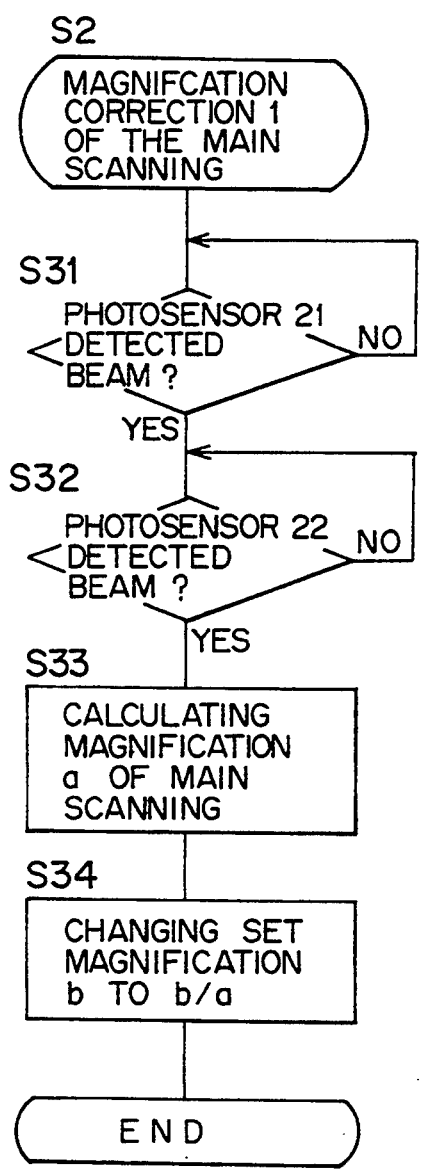
FIG. 20 is a flow chart which shows first example of a subroutine for magnification adjustment in a main scanning direction carried out in step S2 in FIG. 17.

FIG. 20 shows a first example of a subroutine for the magnification correction of the main scanning which is carried out in the step S2. This first example is a method using the photosensors 21 and 22.

First, at steps S31 and S32, a beam which goes through the slit 26a is detected by the photosensors 21 and 22. Based on the time measured from the detection of the photosensor 21 to the detection of the photosensor 22, the present main scanning magnification a is calculated in step S33. Next, the copy magnification b which is set by the operator is changed to b/a.

Figure 21:
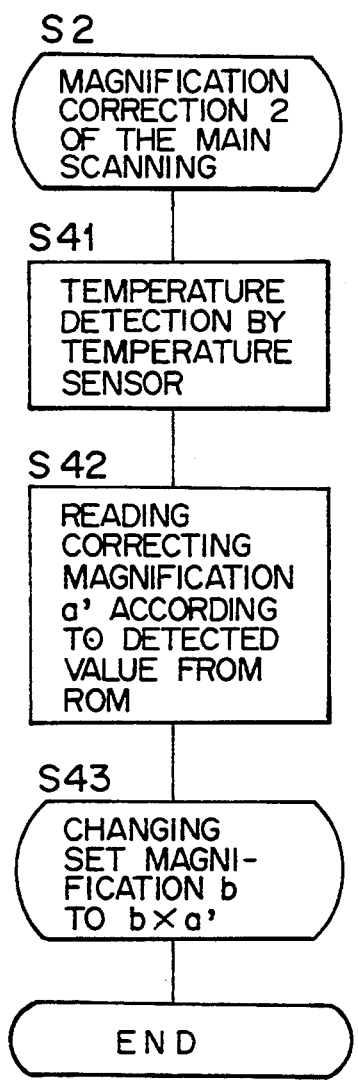
FIG. 21 is a flow chart which shows a second example of the subroutine for magnification adjustment in the main scanning direction carried out in step S2 in FIG. 17.

FIG. 21 shows a second example of the subroutine for the magnification correction of the main scanning which is carried out in step S2. This second example is a method using the temperature sensor 28.

First, the temperature in the laser beam scanning unit 10 is measured by the temperature sensor 28 at step S41, and a correction value a' which is calculated from this measured value is read from the ROM 103 in step 42. Next, the copy magnification b which is set by the operator is changed to b×a'.

In this embodiment, although the lenses 12, 13, 16 and 17 and the mirror 18 are made of plastic, the specified effect can also be obtained by using glass as those material. Further, in the embodiment, the present invention is applied to the color copying machine, but this can be applied to a laser printer.

Although the present invention has been described in connection with the preferred embodiment above, it is to be noted that various changes and modifications are apparent to a person skilled in the art. Such changes and modifications are to be understood as being within the scope of the present invention.

What is claimed is:

1. An image forming apparatus for forming an image on a recording medium comprising:

an image reader for reading an original image optically and outputting digital image data;

a magnification changer for changing magnification of the image data which are outputted from the image reader;

a light source for emitting a laser beam according to the image data which are sent from the magnification changer;

a deflecting member for deflecting the laser beam which is emitted from the light source;

a first optical element for converging the laser beam which is emitted from the light source;

a second optical element for converging the laser beam which is emergent from the first optical element near a deflecting facet of the deflecting member in a linear form extending in a main scanning direction;

a third optical element for imaging the laser beam which is deflected by the deflecting member onto the recording medium;

a detector for detecting a magnification change caused by a change of at least either the first, the second or the third optical element; and a controller for controlling the magnification changer to change magnification of the image data according to a detecting result of the detector.

2. An image forming apparatus as claimed in claim 1, wherein the detector detects a magnification change which is caused by a change in the shape of either the first, the second or the third optical element.

3. An image forming apparatus as claimed in claim 2, wherein:

at least one of the first, the second and the third optical elements is made of a material whose magnification changes with a temperature change; and the detector is means for detecting a temperature of the optical element.

4. An image forming apparatus as claimed in claim 1, wherein the controller controls the magnification changer to counterbalance the magnification change detected by the detector.

5. An image forming apparatus as claimed in claim 1, wherein the detector is positioned optically equivalent to the recording medium and is a light receiving element which is provided at least either a beginning portion or an end portion of the laser beam in the main scanning direction.

6. An image forming apparatus as claimed in claim 5, wherein the light receiving element which is provided at the beginning portion in the main scanning direction also functions as a sensor for detecting a printing start position.

7. An image forming apparatus as claimed in claim 1, wherein the controller forbids a magnification changing operation of the magnification changer during an image printing operation.

8. An image forming method for forming an image on a recording medium comprising the steps of:

obtaining digital image data by reading an original image optically with an image reader;

changing magnification of the image data outputted from the image reader to a specified magnification with a magnification changer;

emitting a laser beam from a light source according to the image data which are sent from the magnification changer;

converging the laser beam which is emitted from the light source with a first optical element, and then converging the beam near a deflecting facet of a deflecting member in a linear form extending in a main scanning direction with a second optical element; and imaging the laser beam which is deflected by the deflecting member on the recording medium with a third optical element;

wherein:

a magnification change which is caused by a change of at least either the first, the second or the third optical element is detected by a detector; and the magnification of the magnification changer is counterbalanced so as to obtain the specified magnification by the controller according to a result of the detector.

9. An image forming method as claimed in claim 8, wherein the controller forbids a magnification changing operation of the magnification changer during an image printing operation.

10. An image forming apparatus for forming an image on a recording medium according to input data, the image forming apparatus comprising:

an image data receiving device for receiving image data;

a magnification changer for changing magnification of image data which are received by the receiving device;

a light source for emitting a laser beam according to the image data which are sent from the magnification changer;

a deflecting member for deflecting the laser beam which is emitted from the light source;

a first optical element for converging the laser beam which is emitted from the light source near a deflecting facet of the deflecting member;

a second optical element for imaging a laser beam which is deflected by the deflecting member on the recording medium;

a detector for detecting a magnification change which is caused by a change of at least either the first optical element, the second optical element or the deflecting member; and a controller for controlling the magnification changer to change magnification of the image data according to a detected result of the detector.

11. An image forming apparatus as claimed in claim 10, the magnification change which is caused by a change of at least either the first optical element, the second optical element or the deflecting member is assumed x, a magnification which is changed by the magnification changer is 1/x.

12. An image forming apparatus as claimed in claim 10, wherein the detector detects a magnification change which is caused by a change in the shape of at least either the first optical element, the second optical element or the deflecting member.

13. An image forming apparatus as claimed in claim 12 wherein:

at least either the first optical element or the second optical element is made of a material whose magnification changes with a temperature change; and the detector is means for detecting a temperature of the optical element.

14. An image forming apparatus as claimed in claim 10 wherein the detector is positioned optically equivalent to the recording medium and is a light receiving element which is provided at least either a beginning portion or an end portion of the laser beam in the main scanning direction.

15. An image forming apparatus as claimed in claim 14 wherein the light receiving element which is provided at the beginning portion in the main scanning direction also functions as a sensor for detecting a printing start position.

16. An image forming apparatus as claimed in claim 10, wherein the controller forbids a magnification changing operation of the magnification changer during an image printing operation.

17. An image forming method for forming an image on a recording medium according to input data, the method comprising the steps of:
- receiving image data with an image data receiving device;
- changing magnification of the image data which are received by the receiving device to a specified magnification with a magnification changer;
- emitting a laser beam from a light source according to the image data which are sent from the magnification changer;
- converging the laser beam which is emitted from the light source near a deflecting facet of a deflecting member in a linear form extending in a main scanning direction with a first optical element; and
- imaging the laser beam which is deflected by the deflecting member on the recording medium with a second optical element;

wherein:
- a magnification change which is caused by a change of at least either the first, the second optical element or the deflecting member is detected by a detector; and
- the magnification of the magnification changer is counterbalanced so as to obtain the specified magnification by the controller according to a result of the detector.

18. An image forming method as claimed in claim 17, wherein the controller forbids a magnification operation of the magnification changer during an image printing operation.

19. An image forming apparatus for forming an image on a recording medium according to input data, the image forming apparatus comprising:
- an image data receiving device which receives image data;
- a magnification changer which changes magnification of the image data outputted from the image receiving device;
- a light source which emits a laser beam according to the image data which are sent from the magnification changer;
- a collimator lens which collimates the laser beam emitted from the light source;
- a cylindrical lens which converges the laser beam collimated by the collimator lens in a linear form extending in a main scanning direction;
- a deflector which deflects the laser beam converged by the cylindrical lens to scan the laser beam in the main scanning direction;
- an $f\theta$ lens which corrects a scanning speed and curvature of field on the recording medium in the main scanning direction;
- detectors for detecting the laser beam deflected by the deflector, the detectors being position optically equivalent to the recording medium at a beginning portion and an end portion of the laser beam in the main scanning direction;
- measuring means for measuring a time between the detection by the detector at the beginning portion and the detection by the detector at the end portion;
- storing means for storing time data which correspond to all possible copy magnifications;
- calculating means for calculating an error of magnification which is caused by a change in shape of at least one of the collimator lens, the cylindrical lens and the $f\theta$ lens by comparing the time measured by the measuring means with the time data stored in the storing means; and
- a controller which controls the magnification changer to change magnification of the image data according to a result of the calculating means.

* * * * *